United States Patent [19]

Schneidinger

[11] 3,978,934
[45] Sept. 7, 1976

[54] AMUSEMENT RIDE POWER

[75] Inventor: Carl Schneidinger, Rolling Hills Estates, Calif.

[73] Assignees: Jon Daugherty; Jay J. Sarno; Carl Schneidinger, all of Las Vegas, Nev.

[22] Filed: Aug. 30, 1974

[21] Appl. No.: 502,177

[52] U.S. Cl. .................................. 180/2; 191/2; 191/13; 307/147
[51] Int. Cl.² ........................................ B60L 9/08
[58] Field of Search ...................... 180/2; 191/13, 2; 46/244 A; 273/86 B; 307/147

[56] References Cited
UNITED STATES PATENTS

| | | |
|---|---|---|
| 1,779,052 | 10/1930 | Souplis .................................. 191/13 |
| 3,339,653 | 9/1967 | Chaplenko ............................. 180/2 |

FOREIGN PATENTS OR APPLICATIONS

| | | | |
|---|---|---|---|
| 268,297 | 7/1927 | United Kingdom ................... 191/13 |

Primary Examiner—M. H. Wood, Jr.
Assistant Examiner—John A. Pekar
Attorney, Agent, or Firm—Herbert C. Schulze

[57] ABSTRACT

This invention is in the field of electrically operated amusement vehicles, such as bumper cars and the like, in which the vehicles receive electrical energy from segments of floor material alternately connected to the different poles of a source of electrical energy. This invention is particularly characterized by a means wherein an alternating current source of electricity is connected to the floor material together with an appropriate corrective circuit arrangement in the vehicle to convert, automatically, so as to provide direct current within the vehicles themselves. A particularly unusual feature includes the method of providing multiphase current in such manner as to provide for increased power and speed to the vehicle depending upon the skill of the operator, together with an electronic speed control.

12 Claims, 8 Drawing Figures

AMUSEMENT RIDE POWER

CROSS REFERENCE TO RELATED PATENT APPLICATIONS

This patent application may be considered related to co-pending patent application Ser. No. 468,430 filed May 9, 1974 jointly by Jay Sarno, Jon Daugherty and me, which application is now U.S. Pat. No. 3,885,502, in that it relates to an amusement ride electrically operated. However, the theory of operation is entirely separate and distinct and this relates to different matters than the aforementioned co-pending patent application, wherein the aforementioned co-pending patent application relates to a track insulating arrangement together with certain features of the track and the car itself, whereas this application relates solely to the Method and Apparatus to use alternating current as the power applied to the track together with speed control mechanism operating with such alternating current.

BACKGROUND OF THE INVENTION

1. Field of the Invention

This invention is in the general field of electrically operated vehicles and more particularly in the field of an electrically operated amusement vehicle receiving its electrical energy from the floor upon which it runs.

2. Description of the Prior Art

In all of the prior art relating to bumper cars, and other amusement type cars in which the vehicle runs upon a metal track or surface from which it receives all or a portion of its electricity for operation, direct current has been required. There is a great deal of such art and vehicles receiving their electrical energy from the surface upon which they travel are not unique; for example, patent application Ser. No. 468,430, filed May 9, 1974, in which I am co-inventor, utilizes such a system. The uniqueness of the present invention lies in utilizing alternating current on the track and thus eliminating costly rectifiers and the like to bring the current to the running surface. In accomplishing this change from a direct current in the track to an alternating current, I have been able, also, to invent a method in which speed control may be accomplished electronically in a manner not previously thought possible with direct current operating motors. Further, I am able to utilize multi-phase current to advantage.

SUMMARY OF THE INVENTION

The use of amusement cars run by electricity transmitted to the car through the track upon which it rides is widespread. Such cars are frequently observed at carnivals, at amusement parks, and other such places.

Some of the cars of this nature are so equipped so as to receive electrical energy from the floor for one pole only and from another source, such as an overhead grid, contacted by an extension from the vehicle for the other pole. In other cases, alternate plates of conductive material with insulators between them carry alternately positive and negative current so that the vehicle has a number of brushes or contact points beneath it such that certain of the brushes or contact points are contacting the appropriate positive and negative sources at all times.

Because of the necessity of operating from alternately positive and negative sources, it has been necessary to utilize rectifiers or the like between the power source and the connection to the alternate conductors in the floor upon which the vehicle is travelling. Such rectifiers are costly; And, they complicate the situation with respect to providing the power.

Another problem is that speed control of such vehicles is very difficult because of the problems of speed control through a direct current source to such vehicle.

I have been studying this situation and have developed a new concept for bumper cars and other amusement cars which travel upon surfaces consisting of alternately activated electrical conductors. I have discovered a unique combination by which I can achieve simple speed control together with use of alternating current in the floor or other surface upon which the vehicles run. I accomplish this by utilizing the features of certain diode arrangements connected between the pickup brushes of the vehicle and the vehicle motor with solid state speed control devices intermediate the said diodes and the pickup point in contact with the surface upon which the vehicle is running. In this manner, I then have the foot pedal or other switch which activates the vehicle connected so as to interrupt and activate the current in the speed control portion prior to the rectified direct current source within the vehicle and thus achieve complete control of the speed of the vehicle other than a mere on and off situation as is normal. With this arrangement, I still have the advantages of the direct current motor for vehicle operation.

Another advantage I can achieve is to locate the vehicle electrical pick-up brushes in such manner that a skilled operator may attempt to pick up more than one phase of a poly-phase electrical power source and achieve the advantage inherent in such case. A concise explanation of the effect of using poly-phase systems is found in "Industrial Electricity" by Chester L. Dawes, Third Edition, Volume 2, as printed by McGraw-Hill Book Company, Inc. At page 106, there is a concise statement which indicates some of the advantage inherent in utilizing a poly-phase system. Those skilled in the art will know of more detail in this regard, however, the following statement on page 106 is considered of interest to those unskilled in the art who may be reading this document: "In many industrial applications of alternating current, there are objections to the use of single-phase power.

In a single-phase circuit, the power delivered is pulsating. Even when the current and voltage are in phase, the power is zero twice in each cycle, FIG. 52. When the power factor is less than unity, not only is the power zero four times in each cycle, but it is negative during two periods in each cycle, FIG. 57. This means that the circuit return energy to the power source for a part of the time and is analogous to a single-cylinder gasoline engine in which the flywheel return energy to the cylinder during the compression part of the cycle. Over the complete cycle, both the single-phase circuit and the flywheel receive an excess of energy over that which they return to the source. The pulsating character of the power in single-phase circuits makes such circuits objectionable in many instances.

A polyphase circuit is somewhat like a multicylinder gasoline engine. With the engine, the power delivered to the flywheel is practically steady, as one or more cylinders are firing when the others are compressing. This same condition exists in polyphase electric systems. Although the power of any one phase is pulsating and may be negative at times, the total power is constant if the loads are balanced. This makes polyphase systems highly desirable for power purposes." This principal applied to this invention means that a skilled operator can attempt to use more than one phase to get more power by the way in which he handles his vehicle so as to contact track segments passing more than one phase to the vehicle.

It is an object of this invention to provide a method and device to supply power to an electrical vehicle, receiving electrical energy from the surface on which it operates, in which the vehicle is powered by a direct current motor, but in which it receives alternting current from the surface upon which it rides.

It is another object of this invention to provide a method and device as above described in which solid state speed control is interposed between the alternating current power and the direct current motor.

It is another object of this invention to provide a method and device as described in which the alternating current is converted to direct current beyond the speed control by the use of appropriate circuitry.

Another object of this invention is to provide a method and device as above described, wherein polyphase electrical energy may be used.

The foregoing and other objects and advantages of this invention will become clear to those skilled in the art upon reading the Description of a Preferred Embodiment which follows in conjunction with the appended drawings.

DESCRIPTION OF A PREFERRED EMBODIMENT

Figure 1:
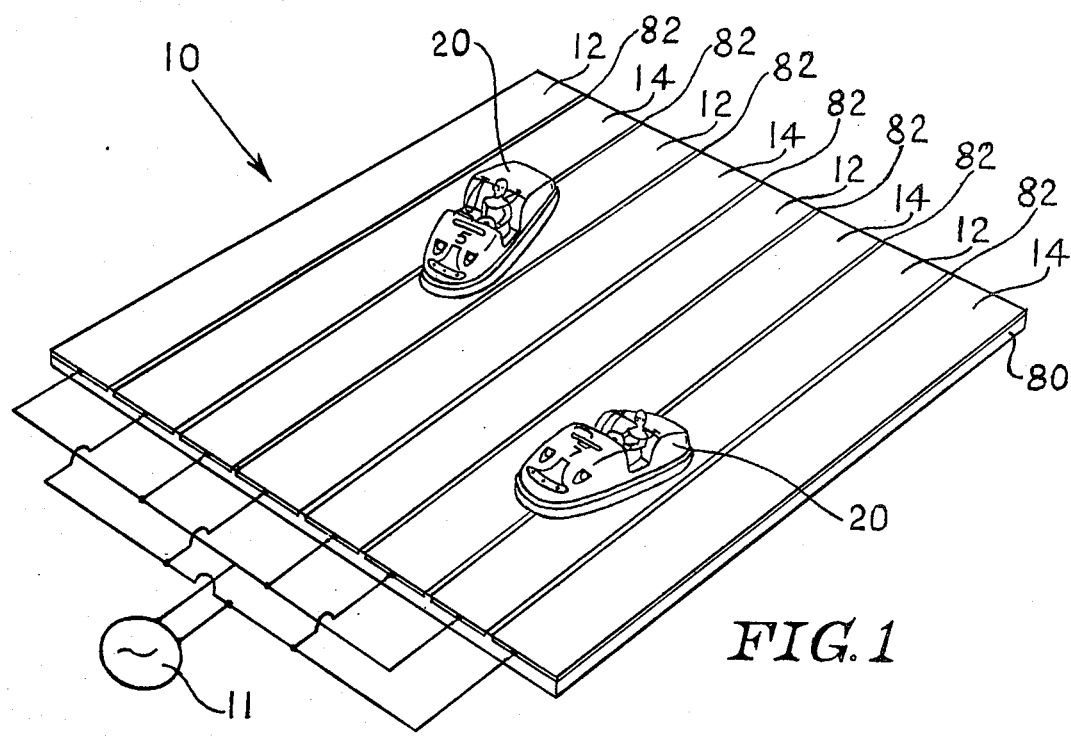
FIG. 1 is a perspective of a floor, with vehicles thereon, to practice the method of this invention.
Figure 2:
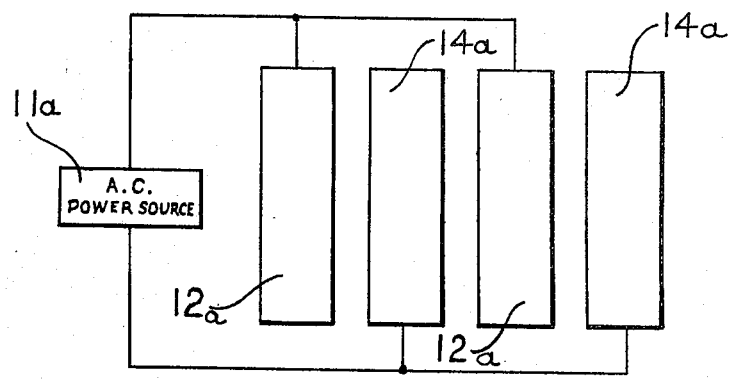
FIG. 2 is a schematic view of the electrical connection to the floor elements for use in the method of this invention.
Figure 3:
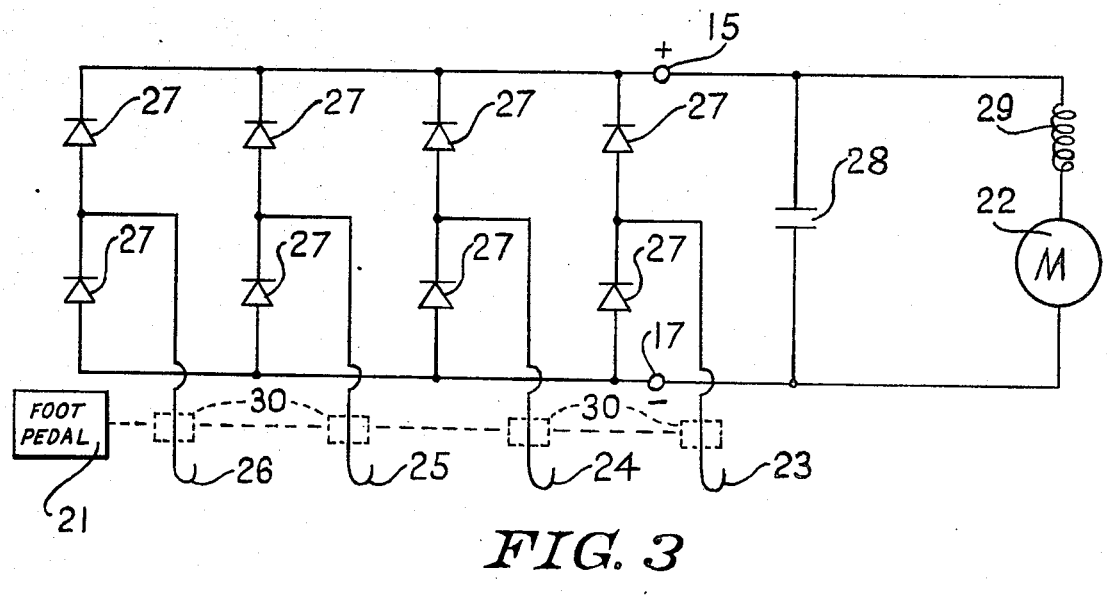
FIG. 3 is a schematic view of the electrical circuit for the vehicle used in practicing the method of this invention.

FIGS. 1, 2 and 3 illustrate, schematically, the simplest form of an apparatus to practice the method of this invention.

In a typical use of the invention, a surface 10 will be composed of a multiplicity of metal plates 12 and 14, upon a suitable base (such as wood) as will be known in the art. The plates constitute the floor upon which the vehicles, such as 20, will travel. Insulating strips 82 will exist between the plates; Merely an insulating space may be desired, but, in general, insulating strips will be preferable in order to provide a uniform surface upon which the vehicle may ride, without indentations between the plates which might interfere with, or cause undue wear of, the wheels, the electrical brushes, or the like.

FIGS. 1 and 2 clearly illustrate the connection to various plates. A single phase alternate current electrical power source 11 is shown with one side connected to plates 12 and one side to plates 14, which are shown to be insulated alternately from each other. The insulation between the plates may, under appropriate circumstances, be a part of the insulated base 80 as shown in FIG. 1.

FIG. 2 is depicted only to make it clearly understood that the electrical energy source 11a is connected from its two poles, alternately, to plates 12a and 14a. In this case the connections are so shown as to make it clear that the alternate plates receive current from alternate sides of the single phase electrical current.

The details of construction of a bumper car or the like, such as illustrated in 20 are known to those skilled in the art. Such cars customarily operate from a direct current motor which is preferable for this type of operation. Usually the direct current motor is built integrally with the front wheel which becomes the driving wheel; But, it may be in any other configuration so as to drive the vehicle.

Placed beneath the car, in a configuration as known in the bumper car art, are a number of pickup brushes, frequently called "shoes", for conducting electrical current to the vehicle motor. The details of construction are not shown because these are known in the art and are utilized where vehicles run upon a surface composed of alternating strips of a conductive material.

For purposes of this specification, in FIG. 3, I have shown a schematic drawing which those skilled in the art will understand. This schematic drawing shows the motor 22 connected to a resistance or the like 29 in a customary manner with a capaciter 28, as shown, for protecting the circuit. Four pickup brushes, or shoes, 23, 24, 25 and 26 may be used. It is understood that the number of pickup brushes used is not critical, but four is customary, and does achieve the desired results.

The pickup brushes or shoes, feed to the motor through a positive and a negative side 15 and 17 respectively since a direct current motor is used. Diodes 27 are interposed in the line so as to block the current in such a manner as to provide only the half phase of the alternating current to the positive side and the other half to the negative side. This, in effect, rectifies the current from the floor so as to provide direct current to the motor.

In the past, it has been customary to rectify the current before it is connected to the conductive surface upon which the vehicles run, and this is a more expensive and complex arrangement. By rectifying the circuit within the vehicle itself, the ease of hookup and operation will be apparent to those skilled in the art. Also, it is more desirable to rectify the current only at the vehicle since rectifiers must be used to protect the circuit in the vehicle, even while the floor current is direct current.

Interposed between each of the pickup shoes or brushes 23, 24, 25, and 26 and the circuit there may be individual control electronic circuits 30, as shown. These in turn will all be connected to a foot pedal 21 which will govern the amount of electricity which flows from the pickup shoes into the circuit and thus to the motor. In this manner, the speed of the motor can be controlled by the throttle.

Prior to my invention of this system, it has not been possible to control the speed of the motor on vehicles of this nature with any degree of economy or effectiveness due to the well known difficulty of controlling the speed for a direct current motor using large resistors or the like.

The configuration of the control circuits 30 is known to those skilled in the art, in general, but in order to particularly exemplify such a circuit as will be effective, attention should be given to FIG. 5 which will be described later, and which incorporates an adequate control circuitry.

Figure 4:
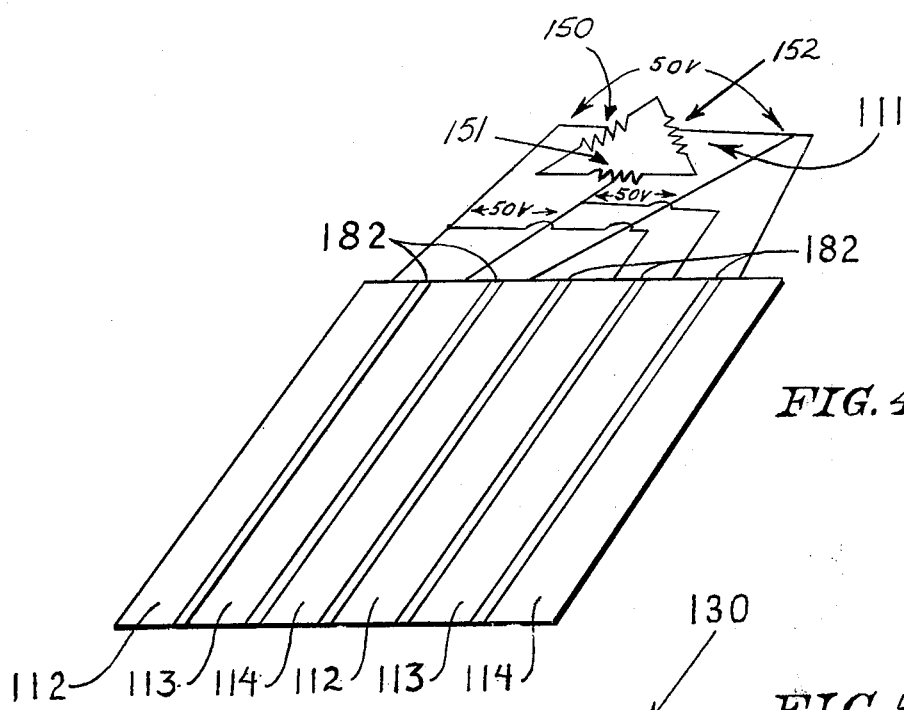
FIG. 4 is a schematic drawing of an alternate electrical arrangement to use in the floor to practice the method of this invention.
Figure 5:
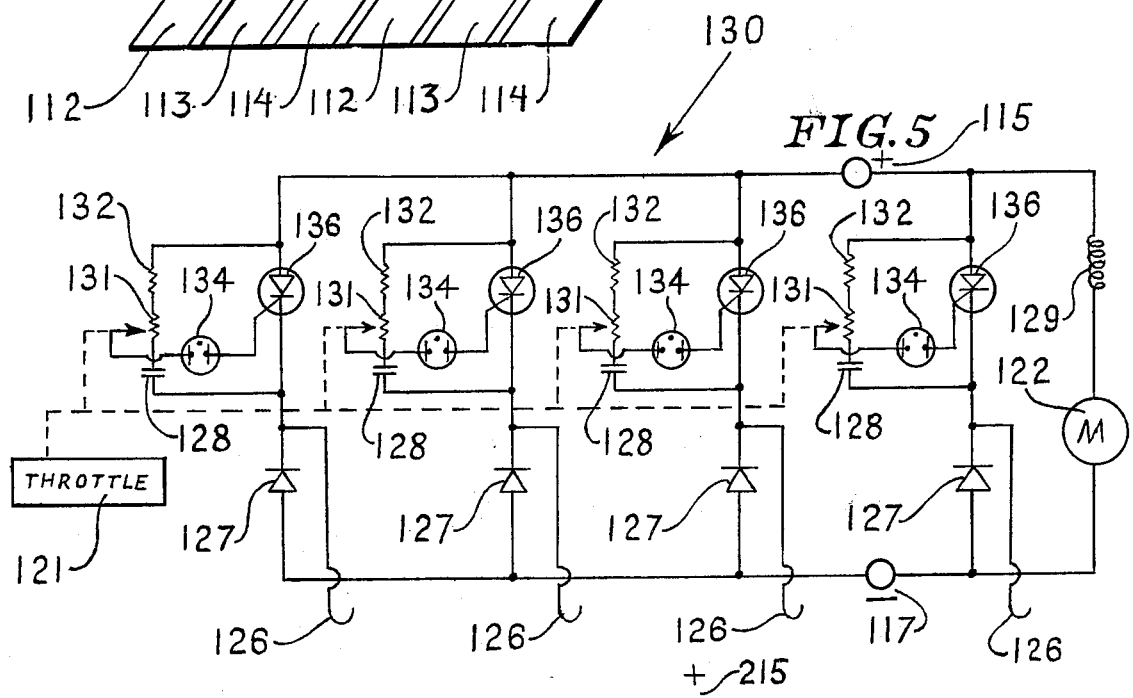
FIG. 5 is a schematic view of an alternate electrical arrangement for the car used in the method of this invention.

Before describing the control arrangement of FIG. 5, it is well to point out that a three phase electrical system may be used for the control of this type floor arrangement. FIG. 4 shows a 50 volt three phase arrangement 111, with legs 150, 151, and 152. The legs are connected as shown, alternately, to plates 112, 113, and 114 as indicated. This schematic diagram will be understood by those skilled in the art, and need not be further examined except to mention that the strips 182 are insulating strips between the plates 112 and 114 which conduct the electricity to the vehicle.

While it is not critical, a voltage of 50 volts has been indicated and this is generally the desired approximate operating voltage to combine ease of operation with safety. The single phase system, of course, is well known. To those skilled in the art, the three phase delta configuration as shown in FIG. 4 is well known. The only thing necessary for proper operation of the vehicle upon a floor of the nature shown in either FIG. 1 or FIG. 4 is that sufficient pickup brushes are located on the underside of the vehicle so as to be receiving, at all times, power from at least two different legs of the power source in order that the current will then be appropriately rectified by the circuitry indicated and provide direct current to the direct current motor.

Examining FIG. 5, it will be observed that one-half of the diodes in the circuitry are silicon controlled rectifiers. The particular circuitry shown in FIG. 5 shows the four pickup shoes as 126, the four diodes 127, the positive and negative poles for the motor 115 and 117, respectively, the resistor 129, and the motor 122. There are four potentiometers 131, one in each circuit, and these are all ganged together and operated by the throttle 121. A suitable resistor, as will be known by those skilled in the art, 132 is interposed in the circuit as indicated. The silicon controlled rectifiers 136 are arranged as indicated, and an appropriate capacitor 128 is in each circuit, together with an appropriate transistor 134.

While the skilled electronic engineer will be able to understand and reconstruct this circuit, values will be given, as follows, for one particular operating circuit.

The potentiometers 131 will each be 50K ohms, the resistors 132 will each be 4.7K ohms, the transistors 134 may be NE2 transistors, and the silicon controlled rectifier may be for example GE20B rectifiers. The capacitors 128 can be effectively 0.15 microfarad capacitors.

In the configuration shown in FIG. 5, the ganged potentiometers will be so arranged in conjunction with the throttle that the throttle may be depressed for maximum and complete speed, and may return by spring control or the like for reduced speed. In this manner, the throttle will control the four potentiometers equally and thus will effectively control the speed of the vehicle.

Figure 6:
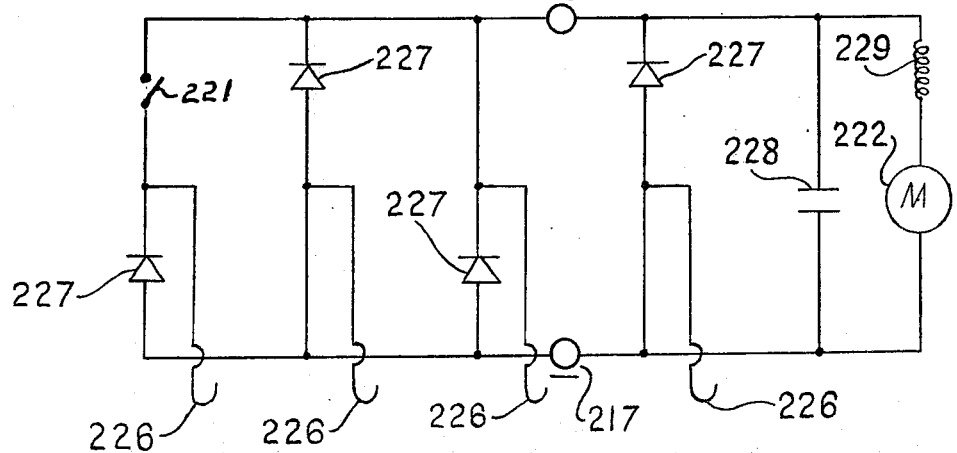
FIG. 6 is another alternate schematic view of the electrical system for a car used in the method of this invention.

A simplified form of circuit, such as the configuration shown in FIG. 6, may be provided for those interested in ultimate economy. In this case, the four pickup brushes 226 will feed the current either directly to the appropriate circuit or through the appropriate diode as the case may be appropriated as indicated. There will be one diode 227 for each pickup brush arranged alternately as indicated on the sketch so as to provide the positive and negative sides of a direct current output 215 and 217 respectively.

A throttle switch 121 may be provided for the simplest on and off control; In this case there will not be speed control. The capacitor 228 will be required for protection of the circuit and the resistance 229 will protect the motor 222. This circuit is not considered to be as effective as the circuits providing for speed control, but is pointed out as a maximum economy circuit.

Figure 7:
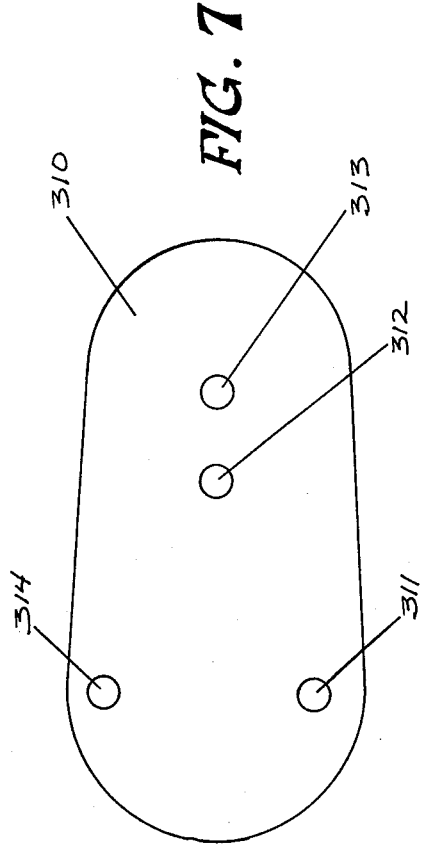
FIG. 7 is a schematic view of the electrical pick-up brushes for a vehicle to be used in practicing the method of this invention.

FIG. 7 is a schematic representation of the pickup brushes or shoes 311, 312, 313, and 314 under a vehicle shown schematically as 310.

Figure 8:
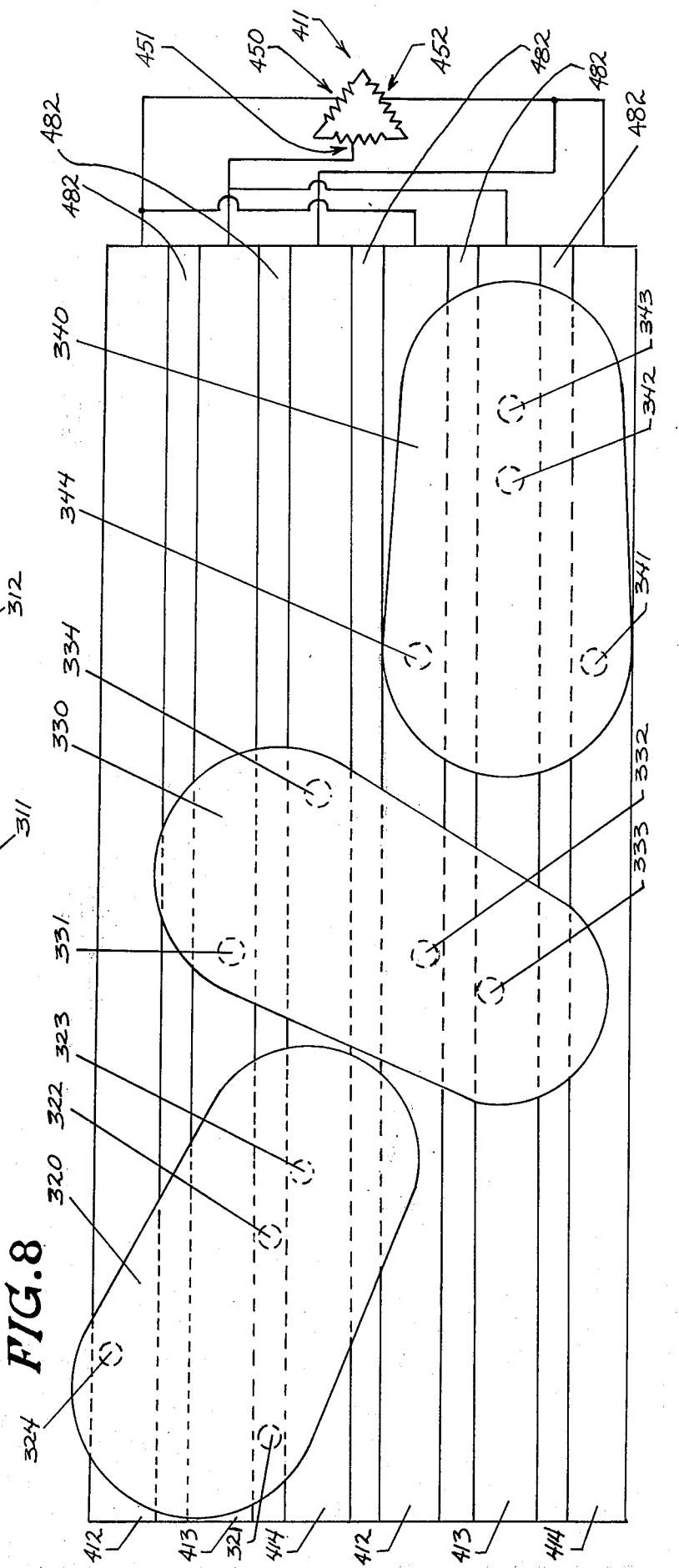
FIG. 8 is a schematic view of a floor with different vehicles represented schematically to indicate the contact by electrical pick-up brushes in practicing the method of this invention.

FIG. 8 shows, schematically, three vehicles 320, 330, and 340 on a schematically illustrated floor comprising two sets of three conductive plates 412, 413, and 414. Each plate is insulated from its neighbors by insulation setups 482. Each plate is connected to one leg 450, 451 or 452 of polyphase electrical source 411.

It will be observed that the three vehicles as shown, are each providing power from a different numbeer of phases of the polyphase electrical source 450. Vehicle 320 is shown to have its shoe 321 on an insulating strip, and its shoe 322 on the same insulating strip. Shoe 323 is on one conductive strip 414 and shoe 324 is on conductive strip 412, thus, the vehicle will receive a single phase of the three phase current available, since it will be receiving the phase between 450 and 452. It will be observed that if this vehicle commences to move in a counter clockwise position, that the 2 shoes 321 and 322 will move onto plate 414 and this will not change the amount of current being received since plate 324 will still be receiving current from the plate 412. It will also be clear to those studying this with an imaginative eye that further changes in the actual configuration and thus the number of phases delivering power will occur upon further movement of the vehicle.

Vehicle 330 has been placed in a position such that each of its shoes is touching a different plate. In this configuration, all three phases will be received by the vehicle, since the different legs will be delivering the power between their connections as indicated. Shoe 331 and 333 will both be in contact with the lead 451. 334 will be in contact with lead 452 and 332 will be in contact with lead 450. Thus, it is clear, that all three phases will be delivered to the vehicle through the circuitry as has been previously described.

Vehicle 340 is shown in such position that its two brushes 342 and 343 will be contacting the lead 451 while brush 341 is in contact with 452, and 344 is in contact with lead 450. Once again, it will be seen that the three phases of power are being utilized.

By careful maneuvering of the vehicle, an adept driver is able to so maneuver the vehicle so as to receive the maximum power by maintaining appropriate brush contact upon the floor segments.

While the embodiment of this invention shown and described is fully capable of achieving the objects and advantages desired, it is to be understood that the embodiments shown are for purposes of illustration only and not for purposes of limitation.

I claim:

1. The combination with a source of polyphase electrical alternating current of: A floor being composed of a number of strips of electrical conductive material alternately connected to different legs of the alternating current source; an entertainment vehicle for travelling upon said floor; A direct current motor operatively connected to said vehicle; a multiplicity of electrical contact elements carried by said vehicle in contact with said floor; circuitry for rectifying said alternating current to direct current between said electrical contact elements and said motor.

2. The combination of claim 1 in which the electrical current is polyphase.

3. The combination of claim 1 in which a speed control element is inserted in the circuit between each electrical contact element and the motor.

4. The combination of claim 3 in which all speed control elements are operated by one control unit.

5. The combination for supplying electrical power from a source of alternating electrical power in which alternate legs of such power are connected alternately to conductive floor elements insulated from one another; an amusement vehicle resting upon said floor elements; a plurality of electrical conductive elements carried by said vehicle and connected to circuitry located in conjunction with said vehicle, which circuitry includes; Diodes interposed between such pickup elements and alternate poles of a motor mounted in driving relationship with said vehicle.

6. The combination of claim 5 in which one diode is connected between each of said pickup shoes and one pole of said motor and another diode is connected between each of said pickup shoes and the other pole of said motor.

7. The combination of claim 6 in which one of each of said diodes between each of said shoes and one pole of said motor is a silicon controlled rectifier.

8. The combination of claim 7 in which each of the said silicon controlled rectifiers is controlled by a transistor and a potentiometer.

9. The combination of claim 8 in which all of said potentiometers are ganged together and operated by one control, which control is the throttle of the vehicle.

10. The method of operating an electrical vehicle, which vehicle is operated by a direct current motor, comprising: Forming a surface for a vehicle to travel upon which surface is composed of a multiplicity of electrically conductive strips of material; Insulating each of said strips from each other strip; Connecting alternate strips of the conductive material to alternate legs of a polyphase alternating current electrical energy source; Providing diodes in an electrical circuit providing power to the direct current motor of said vehicle; Delivering electrical energy through said diodes to said electrical motor by means of electrical contact elements fastened to the said vehicle and electrically connected through said diodes to said motor.

11. The method of claim 10 in which the said diodes include silicon controlled diodes, and in which the speed of the vehicle is controlled by controlling said silicon controlled diodes by means of potentiometers.

12. The method of claim 11 in which the electrical contact elements are positioned upon the vehicle in such manner that by appropriate positioning of the vehicle with relation to the said conductive strips, only 2 of such strips may feed electrical current to the motor in one configuration, and more than 2 in another configuration of location of said vehicle upon said surface.

* * * * *